Aug. 30, 1932.     W. H. MASON     1,875,075
LIQUID SEPARATION
Filed Jan. 25, 1930     2 Sheets-Sheet 1
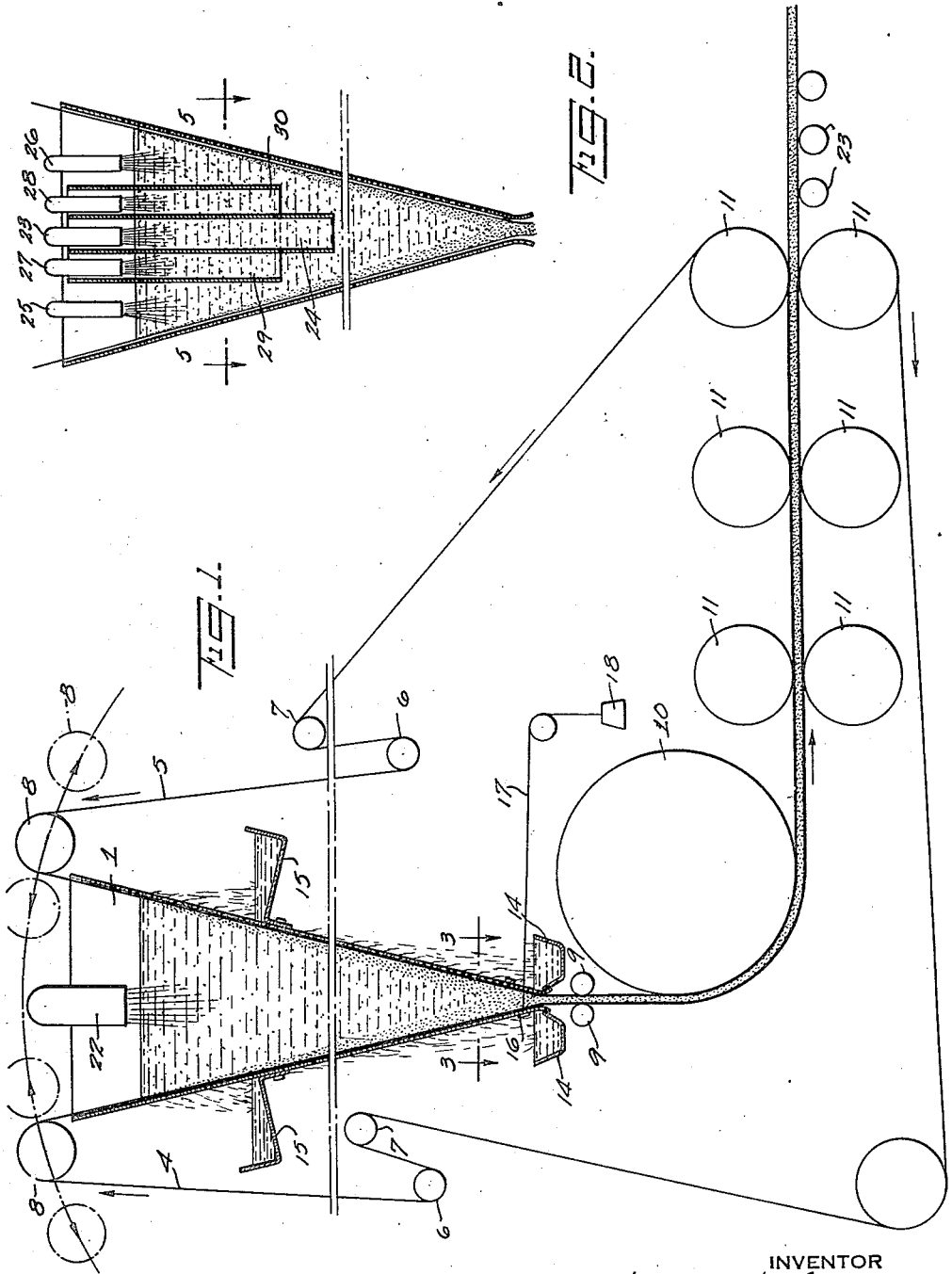
INVENTOR
William H. Mason.
BY
Dyke, Holden & Schaines
ATTORNEYS.

Aug. 30, 1932.  W. H. MASON  1,875,075
LIQUID SEPARATION
Filed Jan. 25, 1930     2 Sheets-Sheet 2
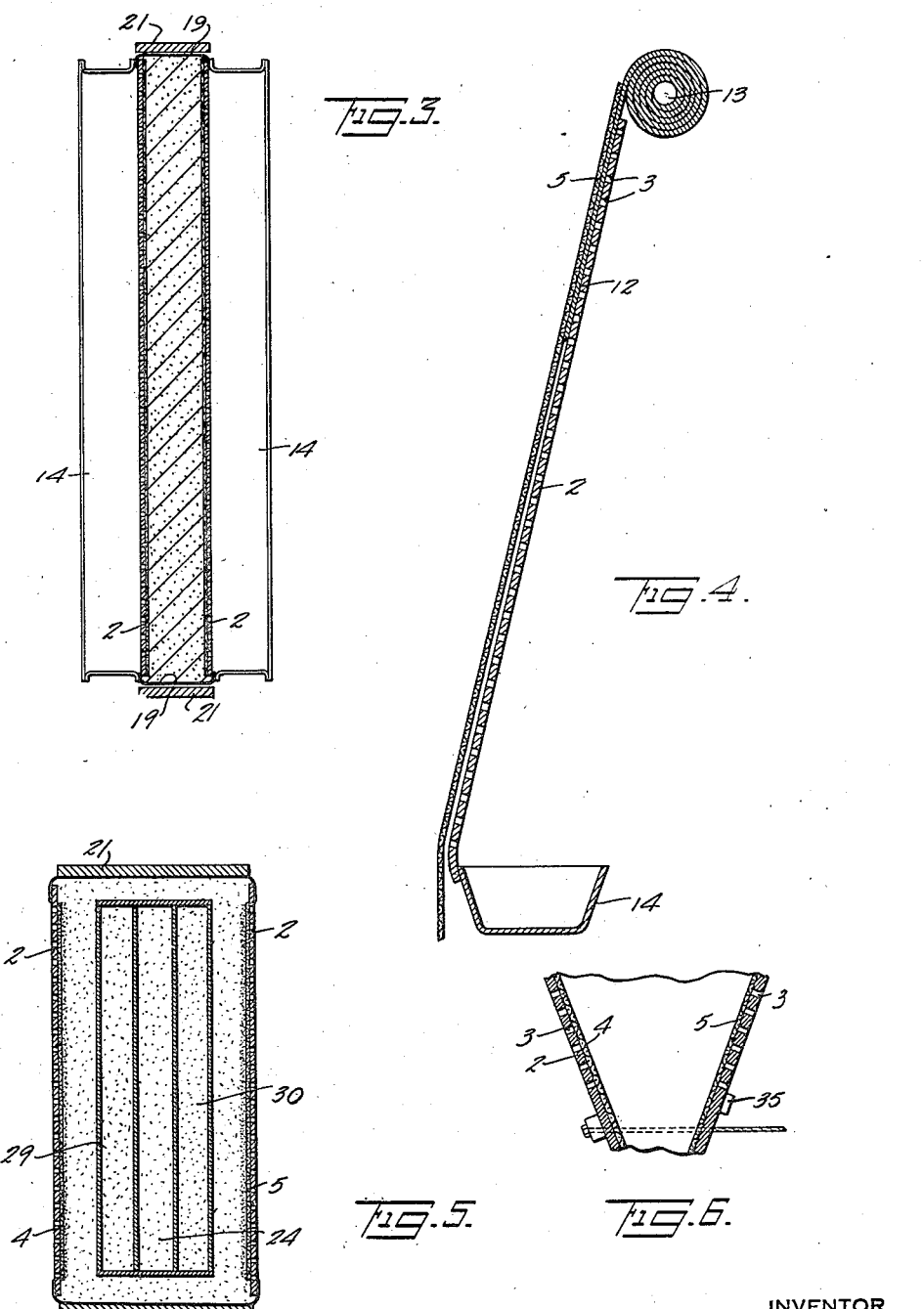
INVENTOR
William H Mason
BY
Dyke, Holden & Schaines
ATTORNEYS.

Patented Aug. 30, 1932

1,875,075

UNITED STATES PATENT OFFICE

WILLIAM H. MASON, OF LAUREL, MISSISSIPPI, ASSIGNOR TO MASONITE CORPORATION, OF LAUREL, MISSISSIPPI, A CORPORATION OF DELAWARE

LIQUID SEPARATION

Application filed January 25, 1930. Serial No. 423,312.

My invention relates to an improved method and means by which water or other mobile liquid may be readily removed from a mixture thereof with solid bodies, whereby the liquids and solids may be separately recovered.

The invention is characterized by its simplicity and capability of treating large quantities of material rapidly and at very low cost. It is adaptable to the treatment of a great variety of mixtures and for a very large number of purposes, some of which are as follows:

(1) The filtration of all kinds of filterable mixtures obtained in manufacturing, including more particularly—

(2) The concentration or dewatering of chemical sludges and metallurgical slimes.

(3) The removal of water from paper pulp.

(4) The recovery of fibre from paper mill white water.

(5) The formation from paper pulp of felted webs to be made into paper or board.

The apparatus in its preferred form comprises a vertically disposed receptacle, such as a tank or hopper for receiving the liquid containing mixture. This receptacle may be of considerable height, and is provided with inlets in its upper portion for admission of the material to be treated and with an outlet or outlets at the bottom for the exit of solid material. The side walls are of foraminated or reticulated material, for example, perforated sheet steel plates, and endless flexible screens or porous belts are caused to travel continuously thereover and in contact therewith, throughout the height of the receptacle or separating chamber.

For certain purposes these screens or belts may be of wire mesh, and for other purposes of canvas, felt, etc.

In one of the most desirable forms of apparatus, the side walls converge from top to bottom, forming a V-shaped chamber, and are adjustable to vary the angle between them and also the distance between their lower ends, and means may be provided for stressing the lower end of one of said walls toward the other.

The end walls may be designed for retaining material within the chamber and for withstanding the hydrostatic pressure of the contents of the chamber. In case the side walls are adjustable, the end walls may be of flexible, elastic, yielding material to permit such adjustment and suitable supports may be applied exterior thereto for resisting hydrostatic pressure.

The removal of liquid takes place by virtue of the lateral efflux thereof through the traveling screens and foraminated side walls of the separation chamber. The impelling force is gravity, and since the chamber may be made of any desired height the pressure of liquid against the traveling screens due to its depth or head may be very great.

The escape of liquid through the screens causes a layer of solid material to be deposited thereon which may be continuously removed therefrom and recovered as the screen travels through that portion of its path which is exterior to the separation chamber.

In order that the invention may be more fully understood, I shall describe the same as applied to the formation of a web of vegetable fibre suitable for use in making paper board or artificial lumber. It will be understood, however, from the foregoing that the scope of the invention is not so limited, and that the description of such particular use of the invention is for purposes of illustration and not for limitation.

Reference is hereby made to the accompanying drawings, of which:

Fig. 1 is a side elevation, partly in section, of one form of apparatus embodying my invention, and particularly adapted for forming a web of fibrous material;

Fig. 2 is a vertical section of the separation chamber provided with multiple pulp feeding means;

Fig. 3 is an enlarged section on line 3—3 of Fig. 1;

Fig. 4 is an enlarged vertical section of one of the side walls of the separation chamber;

Fig. 5 is a section on line 5—5 of Fig. 2; and

Fig. 6 is a detail section of the means for varying the width of the outlet of the separation chamber.

The device shown comprises a V-shaped receptacle 1 the interior of which constitutes the separation chamber. The side walls are composed of plates 2, 2 of any suitable metal or alloy. These plates are formed with closely spaced perforations 3.

A pair of endless screens or belts 4 and 5 are mounted upon rollers as shown and are driven in the directions indicated by arrows, entering the receptacle 1 at the top and passing through the same in contact with the plates 2. These belts are appropriately designed to meet the requirements of the material which is being operated upon. In the apparatus shown the belts are of wire cloth similar to that used as the forming screen of a Fourdrinier machine.

In other types of apparatus for filtering or dewatering sludges, slimes, etc., the belts may be of canvas, felt or any other suitable material.

The width of the screens 4 and 5 may be slightly less than the width of the plates 2, but sufficient to cover the perforations thereof. The tension of the screens is regulated by rollers 6 in the usual manner and automatic guide rolls 7, well known in wet machines, are also provided.

Rolls 8 are mounted upon the side walls of the receptacle 1 for receiving the screens from the tension rolls 6 and guiding them into the receptacle. The screens pass thence along the interior surfaces of the converging plates 2 and through the exit opening at the bottom of the separation chamber.

After issuing from said chamber, the screens may pass between the squeeze rolls 9, thence around drum 10 by which their direction of movement is changed from vertical to horizontal. The screens after leaving the drum 10 pass between squeeze rolls 11, then separate and return to the rolls 8 by paths on opposite sides of the chamber 1.

Means are provided for varying the level at which liquid is permitted to flow through the screen. As shown in Fig. 4, such means may consist of a flexible apron 12 of rubber cloth which is rolled upon a reel or shaft 13 and extends thence between the plate 2 and screen 5, said apron being movable to enable it to cover any desired portion of said plate 2. This apron may if desired be so placed as to contact with the interior surface of the screen 5 or the exterior surface of the plate 2.

At the bottom of the side plates 2 are secured the troughs 14, 14 for conveying liquid away from the separation chamber, and there is an additional pair of troughs 15, 15 secured to the plates 2 and adjustable thereon in a vertical direction for a purpose to be hereinafter described.

The side plates 2 are supported by any suitable means which permit an angular adjustment thereof to vary the angle at which they converge, as indicated by the dotted line positions of the rolls 8, Fig. 1.

Means are also provided for permitting a variation in the distance between the lower edges of said plates 2. For example, one of said plates is stationary, being supported near its lower end by an abutment 35. The lower end of the other plate 2 is movable toward the fixed plate, such movement being permitted by reason of the flexibility of the plate or by supporting the same so as to pivot about an axis remote from said lower end. A flexible cable 17 is attached at one end to the lower end of the movable plate 2, and a weight 18 is secured to the other end of said cable. The weight tends to move the plate to close the gap between the two plates 2, 2, this movement being opposed by the wedging action of the material being carried downward by the screens 5, 5. The weight 18 is so designed as to keep a definite desired pressure upon the material or stock issuing from the separation chamber, and permitting yielding of the movable plate 2 in order to protect the apparatus against breakage due to increase of thickness of such material.

The side wall plates 2 are united by end members 19 which permit the angular adjustment previously described. These members may be of rubber or other material which is capable of stretching to enable the plates 2 to be moved away from each other, or a fold or bight may be formed for such purpose. Rigid backing members 21 are provided to sustain the members 19 against any desired degree of hydrostatic pressure.

The apparatus shown in Fig. 1 is particularly adapted for use as a wet machine in paper making, or for the forming of a thick paper web to be made into pulp board, or artificial lumber, and such use will now be described.

The chamber 1 is kept full to any desired level with pulp mixture from supply pipe 22 and the screens 4 and 5 are continuously driven. The water escapes through the screens and side plates 2 into the troughs 15 and 14 and the web builds up on the surfaces of the converging screens.

The speed of the screens is regulable, as in a Fourdrinier machine, and is preferably adjusted so as to be substantially the same as the velocity of the escaping water, that is, the screens travel downward at substantially the same speed as the fibres so that the fibres come to rest upon the screen surface and upon the previously deposited portion of the web without disturbance, whereby a well felted product with fibres extending in all directions is obtained.

The fibre deposits upon the two screens eventually meet and coalesce to form a single web which emerges from the chamber 1 between the traveling screens 4 and 5. The weight 18 is so adjusted as to cause a substantial squeezing or compressing of the web as it passes through the chamber 1, after which it may be further compressed and dewatered by the action of the rolls 9 and 11, and then delivered to the conveyor rolls 23.

It should be noted that the efflux of water from the pulp mixture is very rapid as compared to the ordinary Fourdrinier machine, for the reason that the forming screens are substantially vertical and water escapes in both directions instead of in only one direction as in the Fourdrinier. The invention has a further advantage in that the web may be readily formed of several different kinds or grades of pulp or fibre. For example, the interior may be composed of a comparatively cheap filler and the surface portions of more highly refined pulp, or the two surface portions may be of fibres of different character.

These results may be readily obtained by merely providing the chamber 1 with multiple feeding means as in Figs. 2 and 5. The lower central portion of the chamber 1 may be supplied with pulp from the pipe 23 and box 24, and the upper side portions with pulp from pipes 25 and 26. Intermediate spaces may be supplied from pipes 27 and 28 and boxes 29 and 30, thus providing for a five layer board, if so desired.

The apparatus shown is very useful for the separation of fibre from the white water of paper mills. Such water contains a considerable quantity of fibre so finely divided as to pass through the forming screen of an ordinary wet machine.

With the present apparatus such fibres may be recovered by introducing the white water into the upper part of the separation chamber through the supply pipe 22, as shown in Fig. 1. The white water need not be mixed with any pulp stock, but may be so mixed if desired. Some of the fibres will deposit on the upper portions of the screws 4 and 5 and will tend to build up a web thereon. However, before the web is thick enough to retain all of the fibres some will escape through the screen into the upper troughs 15. These troughs, being vertically adjustable, are secured in such a position as to catch all of the water coming through the forming screens which carries an appreciable amount of fibre, the water escaping below said troughs being practically free from fibre on account of the web on the screen being thick enough to retain the fibres which deposit thereon.

All of the water from the troughs 15 is continuously returned to the stock chest or directed to the upper part of the separation chamber 1.

The apparatus shown is also very useful for the dewatering of paper pulp of all kinds, and practically all mixtures of a filterable character such as sludges produced in chemical processes, metallurgical slimes, and many other mixtures.

The traveling screens or belts may be of any mesh or degree of porosity and of any desired material, for example, canvas. Obviously, the walls of the separation chamber may be made of any desired height whereby any desired hydrostatic pressure of the mixture under treatment against the surfaces of the belts may be obtained, whereby filtration is enhanced. Inasmuch as such hydrostatic pressure increases uniformly in proportion to the depth of the liquid, the material is subjected to a graduated or uniformly increasing pressure against the screen or belt as it descends. Any suitable means is provided for removing material from the belts as they emerge from the chamber 1, so as to enable them to operate continuously and efficiently upon large quantities of material. The apparatus does not require the use of any suction means and can be operated at very low cost since gravity alone is preferably relied upon for causing the flow of liquid through the traveling filter means, although obviously suction means may, if desired, be applied to the exterior surfaces of the filter means to supplement gravity.

I claim:—

1. A method of felting fibre which comprises maintaining a downward flow of a watery pulp mixture in contact with converging downwardly traveling screens, the rate of flow of the pulp mixture being substantially the same as the rate of travel of the screens, permitting outflow of water through said screens and simultaneously building up a layer of fibre thereon, said outflow of water being permitted at all points below the level at which the material on the two screens is brought together.

2. A method of felting fibre which comprises maintaining a body of water pulp mixture in a chamber between a pair of converging downwardly moving endless screens, permitting outflow of water through said screens and building up layers of fibre thereon until the combined thickness of the two layers is equal to or greater than the distance between the screens, said layers being brought into contact with each other and caused to unite into a single web by the movement of said screens, causing said screens to emerge from said chamber at a point at or near the bottom thereof, and further dewatering said web by applying pressure to said screens after leaving said chamber.

3. A method of felting fibre which comprises continuously feeding a water-pulp mixture or mixtures to the interior surfaces of a pair of converging downwardly moving endless screens and permitting outflow of water therethrough at all points of convergence below the level at which the material on the two screens is brought together to thereby build up layers of fibre thereon, and in feeding pulp of different character or grade to the interior surfaces of said layers to increase their thickness and form composite layers, said composite layers being brought into contact with each other and caused to unite into a single web by the movement of said screens.

4. In apparatus of the class described, the combination of a separation chamber of considerable height, a pair of converging endless filter members movable downwardly therethrough, means for feeding liquid thereto, and means at all points of convergence below the level at which the material on the two screens is brought together for permitting escape of liquid after passage through said filter members.

5. In apparatus of the class described, a separation chamber having an apertured wall, an endless flexible filter member movable in a downward direction through said chamber adjacent said wall, and means for varying the area through which liquid is permitted to escape through said filter member.

6. In apparatus of the class described, a separation chamber having an apertured wall, an endless flexible filter member movable in a downward direction through said chamber adjacent said wall, and means movable along said filter member and wall for varying the area through which liquid is permitted to escape.

7. In apparatus of the class described, a separation chamber, a pair of converging endless filter members movable in a downward direction through said chamber, and means for varying the angle of convergence.

8. In apparatus of the class described, a separation chamber, a pair of converging endless filter members movable in a downward direction through said chamber, and means for biasing one of said filter members toward the other.

9. In apparatus of the class described, a separation chamber having oppositely disposed apertured side walls convergent in a downward direction, and means for varying the angle of convergence.

10. In apparatus of the class described, a separation chamber having substantially flat oppositely disposed, apertured side walls convergent in a downward direction, and means for permitting variation of the distance between the lower extremities of said walls.

11. In apparatus of the class described, a separation chamber having oppositely disposed apertured side walls convergent in a downward direction, and means for biasing one of said walls toward the other.

12. In apparatus of the class described, a separation chamber, a pair of converging endless filter members movable in a downward direction through said chamber, means for guiding said filter members into parallel paths as they leave said chamber, and means for squeezing said filter members, while traveling in parallel relation to each other.

13. In apparatus of the class described, a separation chamber, a pair of converging endless filter members movable in a downward direction through said chamber, and means for guiding said filter members into parallel vertical paths below said chamber, thence into substantially horizontal paths, and means for squeezing said filter members while traveling both in vertical and horizontal directions.

14. In apparatus of the class described, the combination of a separation chamber, a pair of convergent, downwardly movable, endless filter members passing therethrough, and means for guiding said members after leaving said chamber into close proximity to each other in a substantially horizontal path.

15. In apparatus of the class described, the combination of a separation chamber, a pair of convergent, downwardly movable, endless filter members passing therethrough, means for guiding said members after leaving said chamber into close proximity to each other in a substantially horizontal path, and conveying means for receiving material from said filter members at the end of their horizontal path.

16. A chamber structure comprising foraminated side walls converging toward their lower ends and spaced apart at the bottom, screens traveling along the side walls and out through the opening provided between the lower ends thereof, the screens and solid material deposited thereon from sludge introduced into the chamber and interposed therebetween serving to form a closure for the opening between the side walls and to prevent free bottom outlet of sludge material and the foraminations of the side walls permitting escape of liquid at all points of convergence, below the level at which the material on the two screens is brought together.

17. A method of recovering solid material from a mixture containing a large excess of liquid which comprises maintaining a body of the mixture in a separation chamber in contact with convergent filter members moving downwardly through and making exit from said chamber, in continuously building up layers of solid material upon said filter members of sufficient thickness to meet and form a closure to prevent escape of the mixture through the filter member exit and in permitting escape of liquid through said filter members at all points of convergence.

18. A method of felting fibre which comprises maintaining a body of fibre pulp containing a great excess of water in a chamber in contact with a pair of convergent endless screens moving continuously downward, permitting outflow of liquid therethrough at all points of convergence below the level at which the material on the two screens is brought together and thereby building up layers of fibre thereon until the combined thickness of the two layers causes them to be brought into coalescence with each other to form a web, and causing said screens to emerge from said chamber at a point at or near the bottom thereof with the web in contact therewith.

In testimony whereof, I have signed my name hereto.

WILLIAM H. MASON.